(12) United States Patent
Habe

(10) Patent No.: US 7,701,484 B2
(45) Date of Patent: Apr. 20, 2010

(54) DIGITAL STILL CAMERA AND IMAGE BLUR CORRECTION APPARATUS

(75) Inventor: Masaru Habe, Chiyoda-ku (JP)

(73) Assignee: Nikon Corporation, Tokyo (JP)

( * ) Notice: Subject to any disclaimer, the term of this patent is extended or adjusted under 35 U.S.C. 154(b) by 29 days.

(21) Appl. No.: 12/285,105

(22) Filed: Sep. 29, 2008

(65) Prior Publication Data
US 2009/0040319 A1    Feb. 12, 2009

Related U.S. Application Data

(63) Continuation of application No. 10/855,480, filed on May 28, 2004, now abandoned.

(30) Foreign Application Priority Data

Jun. 2, 2003    (JP) ............................. 2003-156811

(51) Int. Cl.
H04N 5/228 (2006.01)
(52) U.S. Cl. ............................. 348/208.12; 348/208.99; 348/208.4
(58) Field of Classification Search ................. 348/208.99–208.16, 229.1
See application file for complete search history.

(56) References Cited

U.S. PATENT DOCUMENTS

| | | | |
|---|---|---|---|
| 5,323,204 A | 6/1994 | Wheeler et al. | |
| 6,388,705 B1 | 5/2002 | Kawahara et al. | |
| 6,392,696 B1 | 5/2002 | Onuki | |
| 6,408,135 B1 | 6/2002 | Imada | |
| 6,603,508 B1 * | 8/2003 | Hata | 348/229.1 |
| 6,625,396 B2 | 9/2003 | Sato | |
| 6,775,476 B2 | 8/2004 | Uchida | |
| 6,778,210 B1 | 8/2004 | Sugahara et al. | |
| 6,900,831 B2 * | 5/2005 | Nishiwaki | 348/208.5 |
| 6,937,286 B2 | 8/2005 | Takeda | |
| 7,050,091 B2 * | 5/2006 | Tull | 348/208.6 |
| 7,064,777 B2 | 6/2006 | Yamazaki | |
| 7,133,070 B2 | 11/2006 | Wheeler et al. | |
| 7,212,231 B2 | 5/2007 | Ohta | |
| 7,292,280 B2 | 11/2007 | Yamazaki et al. | |
| 7,397,500 B2 * | 7/2008 | Yost et al. | 348/208.99 |
| 2002/0097993 A1 | 7/2002 | Imada | |
| 2002/0180876 A1 * | 12/2002 | Sobol | 348/296 |
| 2004/0160525 A1 | 8/2004 | Kingetsu et al. | |
| 2005/0206738 A1 | 9/2005 | Kumaki et al. | |

FOREIGN PATENT DOCUMENTS

| | | |
|---|---|---|
| JP | A-04-076525 A | 3/1992 |
| JP | A-04-265958 A | 9/1992 |
| JP | A-09-022040 A | 1/1997 |
| JP | A-11-249212 | 9/1999 |
| JP | A-2001-157110 | 6/2001 |

* cited by examiner

Primary Examiner—Jason Chan
Assistant Examiner—Pritham Prabhakher
(74) Attorney, Agent, or Firm—Oliff & Berridge, PLC

(57) ABSTRACT

Prior to a photographing operation, an image blur quantity indicating the extent to which the image becomes blurred during the photographing operation is calculated based upon an image-capturing sensitivity having been set, and a decision is made as to whether or not the image-capturing sensitivity needs to be adjusted based upon the calculated image blur quantity. If it is decided that the sensitivity level needs to be adjusted, the image-capturing sensitivity is adjusted and the photographing operation is executed at the shutter speed calculated based upon the adjusted image-capturing sensitivity.

12 Claims, 4 Drawing Sheets

DIGITAL STILL CAMERA AND IMAGE BLUR CORRECTION APPARATUS

This is a Continuation of application Ser. No. 10/855,480 filed May 28, 2004. The disclosure of the prior application is hereby incorporated by reference herein in its entirety.

INCORPORATION BY REFERENCE

The disclosure of the following priority application is herein incorporated by reference:

Japanese Patent Application No. 2003-156811 filed Jun. 2, 2003

BACKGROUND OF INVENTION

1. Field of the Invention

The present invention relates to a digital still camera, and more specifically, it relates to a technology for reducing the extent to which an image becomes blurred.

2. Description of the Related Art

An image blur caused by an unsteady hand movement or the like during a photographing operation greatly detracts from the appearance of the resulting picture and thus greatly lowers the value of the photograph. The extent of such an image blur increases as the shutter speed decreases. Generally, a significant extent of image blur is said to manifest in a photograph taken by holding a 35 mm camera mounted with a photographic lens with a focal length of f [mm], if the shutter speed becomes lower than 1/f [sec]. Accordingly, various attempts have been made in the related art to reduce the extent of image blur.

Japanese Laid Open Patent Publication No. H 11-215432 discloses a digital still camera designed to reduce the image blur without having to detect any camera vibration. By taking advantage of a digital still camera feature which allows the ISO speed to be adjusted for each frame, the ISO speed level is raised if the calculated shutter speed is lower than a hand movement limit value so as to sustain a high shutter speed in this digital still camera. While the shutter speed can be sustained at a high level by raising the ISO speed, this method has a problem in that the image quality becomes poor due to noise.

SUMMARY OF THE INVENTION

A digital still camera according to the present invention comprises: a sensitivity setting device that sets an image-capturing sensitivity; a photographing device having an image-capturing element that receives a light flux transmitted through a photographic lens and executes photoelectric conversion on the received light flux; a control device that engages the photographing device in operation at a shutter speed corresponding to the image-capturing sensitivity set by the sensitivity setting device; an image blur calculation device that calculates an image blur quantity indicating an extent to which an image becomes blurred during a photographing operation based upon the image-capturing sensitivity having been set prior to the photographing operation; and a determination device that makes a decision as to whether the image-capturing sensitivity needs to be adjusted based upon the image blur quantity calculated by the image blur calculation device, wherein: the sensitivity setting device adjusts the image-capturing sensitivity if the determination device determines that the image-capturing sensitivity needs to be adjusted; and if the image-capturing sensitivity is adjusted, the control device engages the photographing device in operation at a shutter speed corresponding to the adjusted image-capturing sensitivity.

It is preferable if the calculated image blur quantity exceeds a predetermined limit value, the sensitivity setting device shifts the image-capturing sensitivity to a higher level so as to lower the image blur quantity to a value equal to or less than the limit value.

It is preferable that the image blur calculation device includes a vibration detection sensor that detects an extent of vibration to which the digital camera is subjected, and calculates the image blur quantity indicating the extent to which the image becomes blurred during the photographing operation based upon detection results provided by the vibration detection sensor and the shutter speed determined in conformance to photometering results obtained by photometering a photographic field and the image-capturing sensitivity having been set. An optical image blur correction mechanism that reduces the extent of image blur based upon an output from the vibration detection sensor may be further comprised and it is preferable that the determination device determines that the image-capturing sensitivity needs to be adjusted if the image blur quantity cannot be lowered to a value equal to or less than a predetermined limit value through an image blur correction alone executed by the optical image blur correction mechanism.

The sensitivity setting device may set the image-capturing sensitivity to a lowest possible sensitivity level within a range over which the calculated image blur quantity does not exceed a predetermined limit value.

An image blur correction apparatus according to the present invention comprises a sensitivity setting device that sets an image-capturing sensitivity; an image capturing command output device that outputs a signal for engaging an image-capturing element in photoelectric conversion at a shutter speed corresponding to the image-capturing sensitivity set by the sensitivity setting device; an image blur calculation device that calculates an image blur quantity indicating an extent to which an image becomes blurred during a photographing operation based upon the image-capturing sensitivity having been set, prior to the photographing operation; and a determination device that makes a decision as to whether the image-capturing sensitivity needs to be adjusted based upon the image blur quantity calculated by the image blur calculation device, wherein: the sensitivity setting device adjusts the image-capturing sensitivity if the determination device determines that the image-capturing sensitivity needs to be adjusted; and when the image-capturing sensitivity is adjusted, the image capturing command output device outputs the signal to the image-capturing element to engage the image-capturing element in photoelectric conversion at the shutter speed corresponding to the adjusted image-capturing sensitivity. It is preferable to further comprise a blur preventing mode switch operated to set/clear a blur preventing mode in which control is implemented to reduce the extent of image blur by adjusting the image-capturing sensitivity.

DESCRIPTION OF THE PREFERRED EMBODIMENT

The following is an explanation of an embodiment of the present invention, given in reference to drawings.

Figure 1:
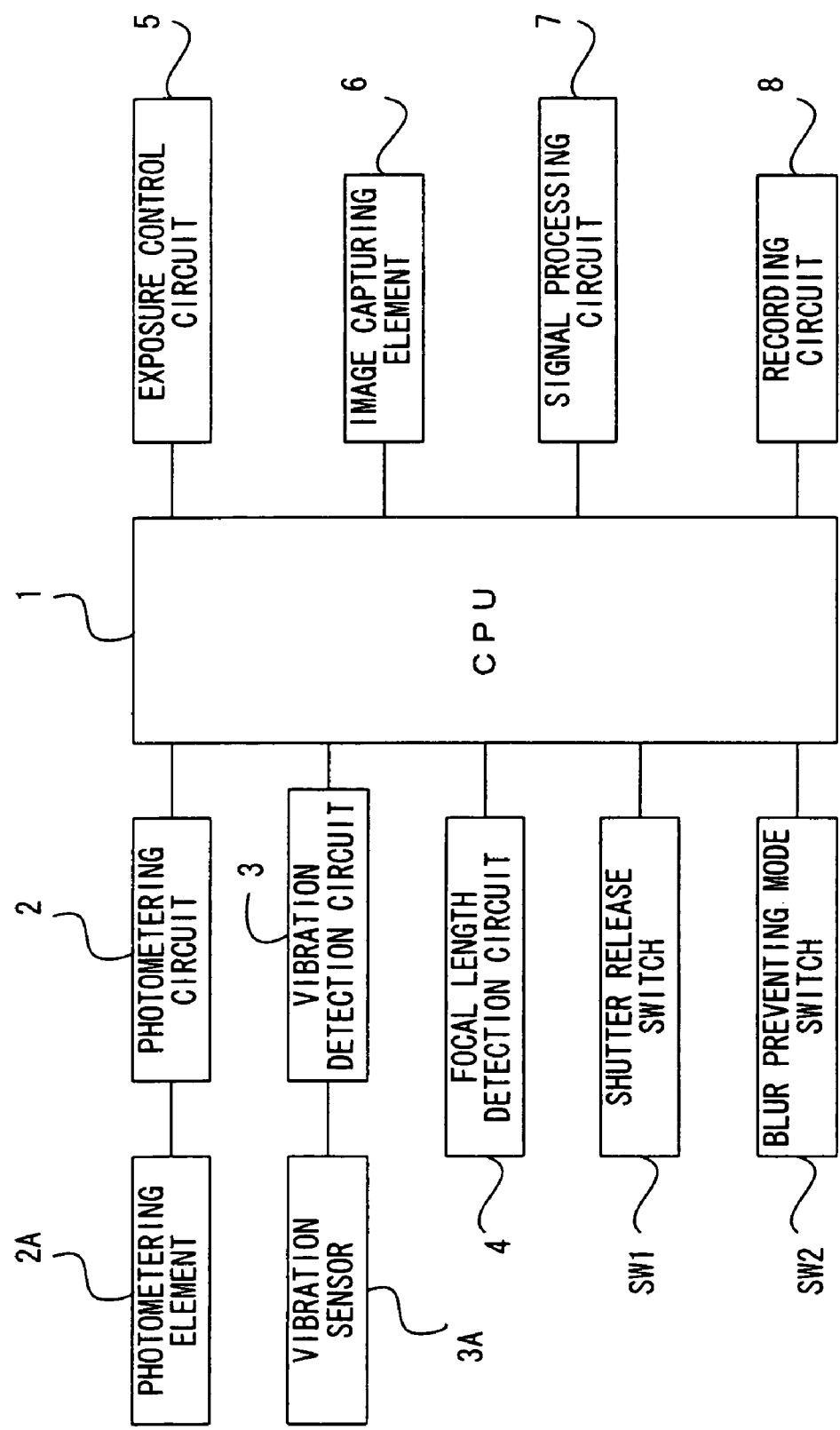
FIG. 1 is a block diagram of a control system of a digital still camera achieved in an embodiment of the present invention.
Figure 3:
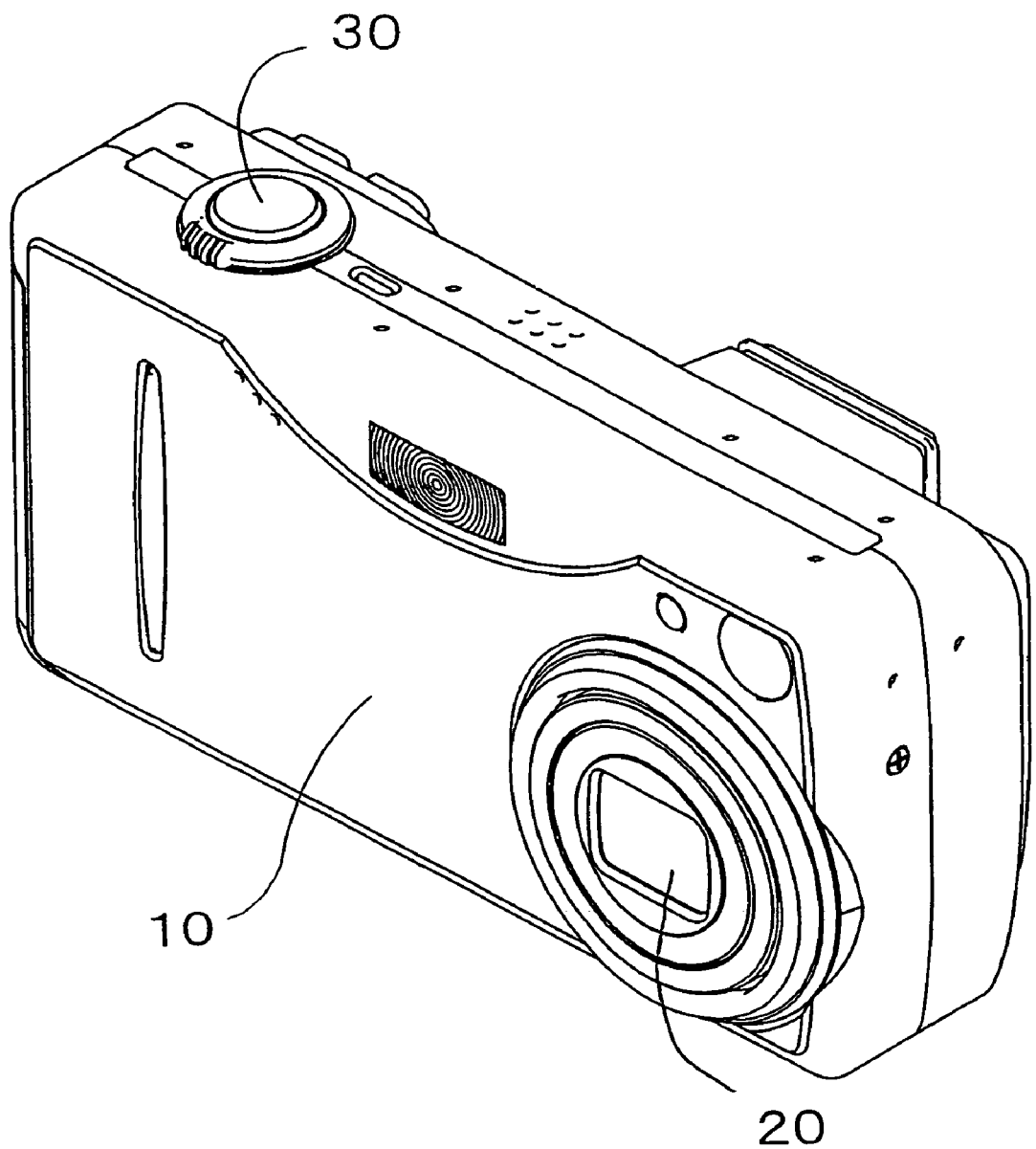
FIG. 3 presents an external view of the digital still camera achieved in the embodiment.

FIG. 1 is a block diagram of a control system of a digital still camera 10 achieved in the embodiment. FIG. 3 is a schematic external view of the digital still camera 10 having the control system shown in FIG. 1.

A photometering circuit 2, a vibration detection circuit 3, a focal length detection circuit 4, an exposure control circuit 5, an image-capturing element 6 and a signal processing circuit 7 are connected to a CPU 1. The photometering circuit 2 detects the brightness level of a subject by using a photometering sensor 2A and inputs the detected brightness level to the CPU 1. The vibration detection circuit 3 detects the extent of vibration to which the camera is subjected by using a vibration sensor 3A constituted of an angular speed sensor or the like and inputs the detected vibration quantity to the CPU 1. The focal length detection circuit 4 detects the focal length of a photographic lens 20 and inputs the detected focal length to the CPU 1.

The exposure control circuit 5 executes a photographing operation (exposure) by driving a shutter and an aperture (not shown). The image-capturing element 6 receives a light flux transmitted through the photographic lens 20, generates image capturing signals from the light flux thus received and provides the image capturing signals to the signal processing circuit 7. The signal processing circuit 7 generates image data by executing various types of processing on the image capturing signals and provides the image data to a recording circuit 8. The recording circuit 8 records the image data into a recording medium such as a memory card. The exposure control circuit 5, the image-capturing element 6, the signal processing circuit 7 and the like constitute a photographing device.

In addition, a shutter release switch SW1, which is turned on in response to an operation of a shutter release button 30, and a blur preventing mode switch SW2 operated to set/clear a blur preventing mode are connected to the CPU 1.

Under normal circumstances, the CPU 1 sets the ISO speed in conformance to a photographer operation and calculates an exposure value (an aperture value and a shutter speed) based upon the ISO speed that has been set and the photometering output from the photometering circuit 2. However, if the blur preventing mode has been set, it calculates the exposure value by automatically adjusting the ISO speed setting as appropriate for the circumstances as detailed later.

The "ISO speed" was originally a term used in international standards to refer to the sensitivity of silver halide film to light. The term "ISO speed" used in reference to digital still cameras is actually the sensitivity (image-capturing sensitivity) of the image-capturing element 6 converted to an ISO speed. However, the term "ISO speed" is often used in a general way to refer to the image-capturing sensitivity of a digital camera and the term is also used in this general sense in this specification. It is to be noted that the term "image-capturing sensitivity" refers to a control target quantity to be achieved by adjusting one of; the sensitivity level with which the signal charges at the output unit of the image-capturing element 6 are detected, the amplification gain of a variable gain amplifying circuit (not shown) that amplifies the output from the image-capturing element 6 and the exposure quantity which is varied by altering the duty of the operational timing of the image-capturing element 6.

In the camera 10 adopting the structure described above, the CPU 1 sets the blur preventing mode as the blur preventing mode switch SW2 is turned on. In the blur preventing mode, the vibration detection circuit 3 is engaged prior to a photographing operation so as to detect a camera vibration quantity indicating the extent of vibration to which the camera is subjected due to an unsteady hand movement or the like and to calculate an image blur quantity based upon the vibration quantity. The image blur quantity represents the extent to which the subject image vibrates and becomes blurred at an image forming plane, i.e., at a light receiving surface of the image-capturing element 6, during the exposure. Other parameters such as the shutter speed and the focal length of the photographic lens 20 are needed in addition to the camera vibration quantity to calculate the image blur quantity. The shutter speed to be used as a parameter can be calculated based upon the photometering results and the ISO speed setting.

It is to be noted that in a camera having a mechanical shutter used to control the length of time over which the light flux enters the image-capturing element 6, the length of time over which the shutter remains open is equivalent to the shutter speed. In a camera having an electronic shutter used to control the length of time over which charges are stored at the image-capturing element 6, the length of time over which the electrical charges are stored at the image-capturing element 6 is equivalent to the shutter speed.

If the image blur quantity having been calculated exceeds a predetermined blur limit value, the extent of the image blur is judged to be significant and accordingly, the ISO speed is automatically shifted toward the higher sensitivity side. The extent to which the ISO speed is shifted (the number of stages over which the ISO speed is shifted) can be calculated as;

$$n = \log_2 \text{(image blur quantity/blur limit value)} \qquad (1)$$

By raising the sensitivity by n stages, the shutter speed can be shifted toward the higher side by n stages without further opening the aperture, i.e., without affecting the field depth. It is to be noted that if n is calculated to be a decimal value, n should be rounded up to the higher integer to be on the safe side. For instance, if the calculated value of n is a numerical value between 1 and 2, it should be rounded up to 2. By adopting this method, it becomes possible to ensure that the image blur quantity never exceeds the limit value and thus to ensure that the image blur does not become conspicuous in the image.

It is to be noted that the blur limit value set with regard to the image blur quantity is a threshold value used to judge as to whether or not the extent of an image blur occurring in an image is within an allowable range.

In more specific terms, let us consider a situation in which the ISO speed setting is ISO 100 in a camera that allows the ISO speed to be set to ISO 100, ISO 200, ISO 400, ISO 800 or ISO 1600 and the image blur quantity having been calculated is 60 µm. It is generally accepted that as long as the image blur quantity of a given image blur at the image forming plane does not exceed 30 µm, the blur does not manifest a discernible image blur in a regular photographic image. Since the calculated image blur quantity is 60 µm, a rather conspicuous image blur will manifest in the photographic image. Accordingly, the shift quantity n is calculated by substituting 30 µm for the blur limit value in expression (1);

$$n = \log_2 (60/30) = 1$$

Namely, by raising the ISO speed by one stage, i.e., from ISO 100 to ISO 200, the shutter speed can be shifted to the higher side by one state (e.g., 1/60 sec ->1/125 sec). As a result, the image blur quantity can be reduced from 60 μm to 30 μm. Likewise, if n=2, the image blur quantity can be reduced to 30 μm by shifting the ISO speed by two stages from ISO 100 to ISO 400, and if n=5, the image blur quantity can be reduced to 30 μm by shifting the ISO speed by five stages from ISO 100 to ISO 1600.

When the calculated shutter speed is low, the shutter speed can be raised by increasing the ISO speed, but, at the same time, the image quantity is bound to become poorer due to noise. Most experienced photographers are likely to know how to hold and operate cameras by minimizing an unsteady hand movement which results in an image blur and are thus likely to be capable of photographing pictures without blurring the images even when the shutter speed is fairly low. For this reason, experienced photographers will not often want the sensitivity to be raised simply because the shutter speed is low, since it will only lower the image quality unnecessarily. However, if the shutter speed threshold value at which the sensitivity is raised is set to a lower value, inexperienced photographers will end up with blurred images.

In the embodiment, instead of raising the ISO speed based upon the shutter speed, the image blur quantity representing the extent to which the image becomes blurred during the exposure is estimated through an arithmetic operation and the ISO speed is raised based upon this image blur quantity. As a result, the extent of image blur can be effectively reduced by increasing the sensitivity for an inexperienced photographer who is not likely to be able to handle his camera with a steady hand. At the same time, if an experienced photographer is handling the camera with a steady hand, the sensitivity is not raised unnecessarily and thus, the image quality is sustained at a desired level. In addition, the extent of image blur can be effectively reduced by increasing the sensitivity even for an experienced photographer when, for instance, he is forced to photograph pictures in a situation in which some unsteady movement is unavoidable.

The extent of image blur may be reduced by detecting vibration of the camera caused by a hand movement and photographing a picture with the timing with which the image blur is minimized, or by emitting light with a flash unit to reduce the extent of the image blur if the photographer is forced to take a picture in a fairly shaky state. When photographing a picture with the timing that will minimize image blur, the shutter release timing is not constant, and thus, the photographer may miss a good photo opportunity. When the extent of the image blur is reduced by using a flash unit, the image blur in an image which the photographer wishes to photograph without using the flash unit cannot be reduced.

By adopting the embodiment, it is ensured that the photographer does not miss a good photo opportunity since the shutter release timing does not change in correspondence to the degree of vibration and also, the photographer is allowed to take blur-free pictures without having to emit light with the flash unit. Furthermore, as the camera does not need to be equipped with any expensive device such as an optical image blur correction mechanism, the increase in the production cost can be minimized.

Figure 2:
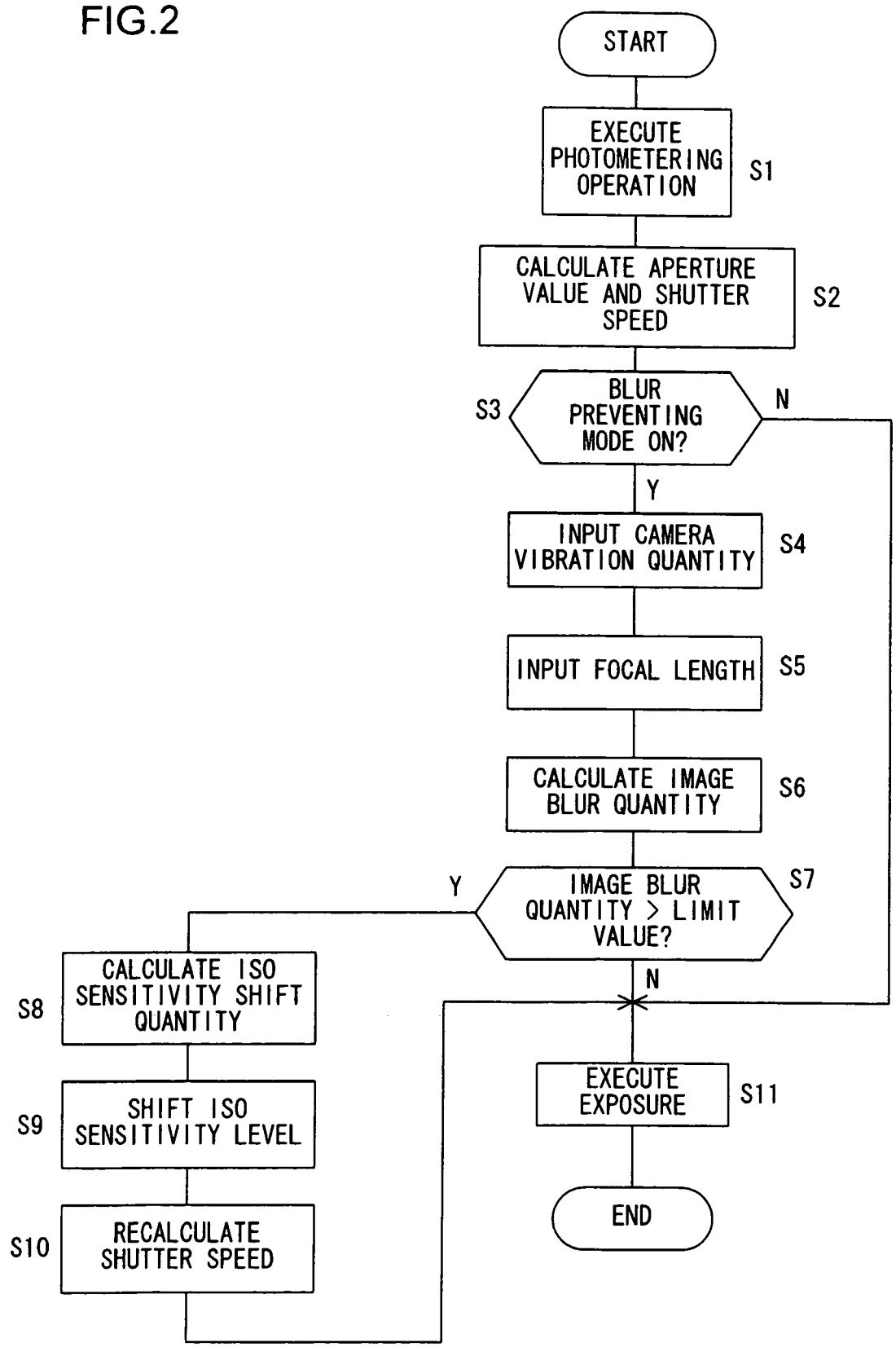
FIG. 2 presents a flowchart of control implemented during image blur correction processing in the camera achieved in the embodiment.

FIG. 2 presents a flowchart of the processing executed by the CPU 1 in conformance with the blur preventing control program described above.

The CPU 1 starts up this program as the shutter release switch SW1 is turned on, and it engages the photometering circuit 2 in a photometering operation in step S1. In step S2, the CPU 1 calculates the aperture value and the shutter speed based upon the photometering results and the ISO speed setting.

In step S3, a decision is made as to whether or not the blur preventing mode is currently set based upon a signal provided by the blur preventing mode switch SW2. If it is determined that the blur preventing mode is currently set, the operation proceeds to step S4 to engage the vibration detection circuit 3 in operation and to read the detection output indicating the camera vibration quantity from the vibration detection circuit 3. In addition, the focal length of the photographic lens 20 detected and output by the focal length detection 8 circuit 4 is read in step S5. In step S6, the image blur quantity indicating the extent of image blur that occurs during the exposure is calculated based upon the shutter speed calculated in step S2 and the camera vibration quantity and the focal length respectively detected in steps S4 and S5.

The operation then proceeds to step S7 to compare the image blur quantity calculated in step S6 with the blur limit value (e.g., 30 μm). If the image blur quantity exceeds the blur limit value, the operation proceeds to step S8 to calculate the number of stages n over which the ISO speed is to be shifted by using expression (1) presented earlier. In the following step S9, the ISO speed is shifted toward the higher side by n stages calculated in step S8. In step S10, a new shutter speed is calculated based upon the photometering results obtained in step S1 and the ISO speed adjusted in step S9. By shifting the ISO speed, the shutter speed can be shifted toward the higher side by n stages.

It is to be noted that if the ISO speed is already set at the highest limit, the sensitivity cannot be increased any further and accordingly, an image blur warning should be issued.

In step S11, the exposure control circuit 5 is engaged to execute exposure by driving the aperture and the shutter based upon the aperture value calculated in step S2 and the most recently calculated shutter speed. It is to be noted that image signals obtained through the exposure are processed and the like through another routine.

If, on the other hand, it is determined in step S7 that the image blur quantity is equal to or lower than the blur limit value, the shutter speed does not need to be raised, i.e., it is not necessary to increase the ISO speed. Accordingly, the operation simply proceeds to step S11. In addition, if the blur preventing mode is not set currently, the operation proceeds directly to step S11 from step S3. In these situations, the photographing operation is executed at the initial ISO speed setting and the aperture value and the shutter speed calculated in step S2.

It is to be noted that certain restrictions may be imposed with regard to the adjustment of the ISO speed setting. For instance, even when the highest ISO speed level in the camera is ISO 3200, ISO 800 may be set as the upper limit to which the sensitivity can be shifted upward in correspondence to the image blur quantity so as to prevent the image quality from becoming markedly poorer. In addition in a mode in which the shutter speed is set by the photographer, e.g., a shutter speed priority mode or a manual mode, any increase in the sensitivity that will result in a change in the shutter speed may be disallowed to give precedence to the photographer's intent.

While the sensitivity is raised when the calculated image blur quantity exceeds the blur limit value in the explanation given above, the ISO speed may instead be shifted toward the lower side to improve the image quality when the calculated image blur quantity is small. For instance, if the current initial ISO speed setting is ISO 400 and the calculated image blur quantity is 10 μm, the ISO speed setting may be adjusted to ISO 200. By lowering the ISO speed by one stage in this manner, the shutter speed is also lowered by one stage to result in an increase in the image blur quantity to 20 μm. However, since 20 μm is still less than the blur limit value 30 μm explained earlier, it is not likely to manifest as a discernible image blur. If, on the hand, the ISO speed is lowered to ISO 100, the image blur quantity will increase to 40 μm, well over the blur limit value. Accordingly, the ISO speed is not lowered any further than ISO 200 in such a situation. By adjusting the ISO speed to the lowest level at which the calculated image blur quantity does not exceed the blur limit value, the image quality can be improved while, at the same time, preventing a discernible image blur.

The image blur limit value does not need to be set to 30 μm. In addition, while an explanation is given above on an example in which the ISO speed is adjusted in an increment of a single stage, it may instead be adjusted in units of ½ stages, ⅓ stages or even finer increments. Furthermore, while the camera vibration is detected with the vibration sensor 3A such as an angular speed sensor, the vibration may be detected with another type of sensor. Alternatively, instead of utilizing the vibration sensor 3A, the extent of image blur may be detected based upon the detection results (a so-called through image that is displayed on a monitor of the digital still camera 10 in real time before or after the shutter release button 30 is pressed) output from the image-capturing element 6 in real time.

Figure 4:
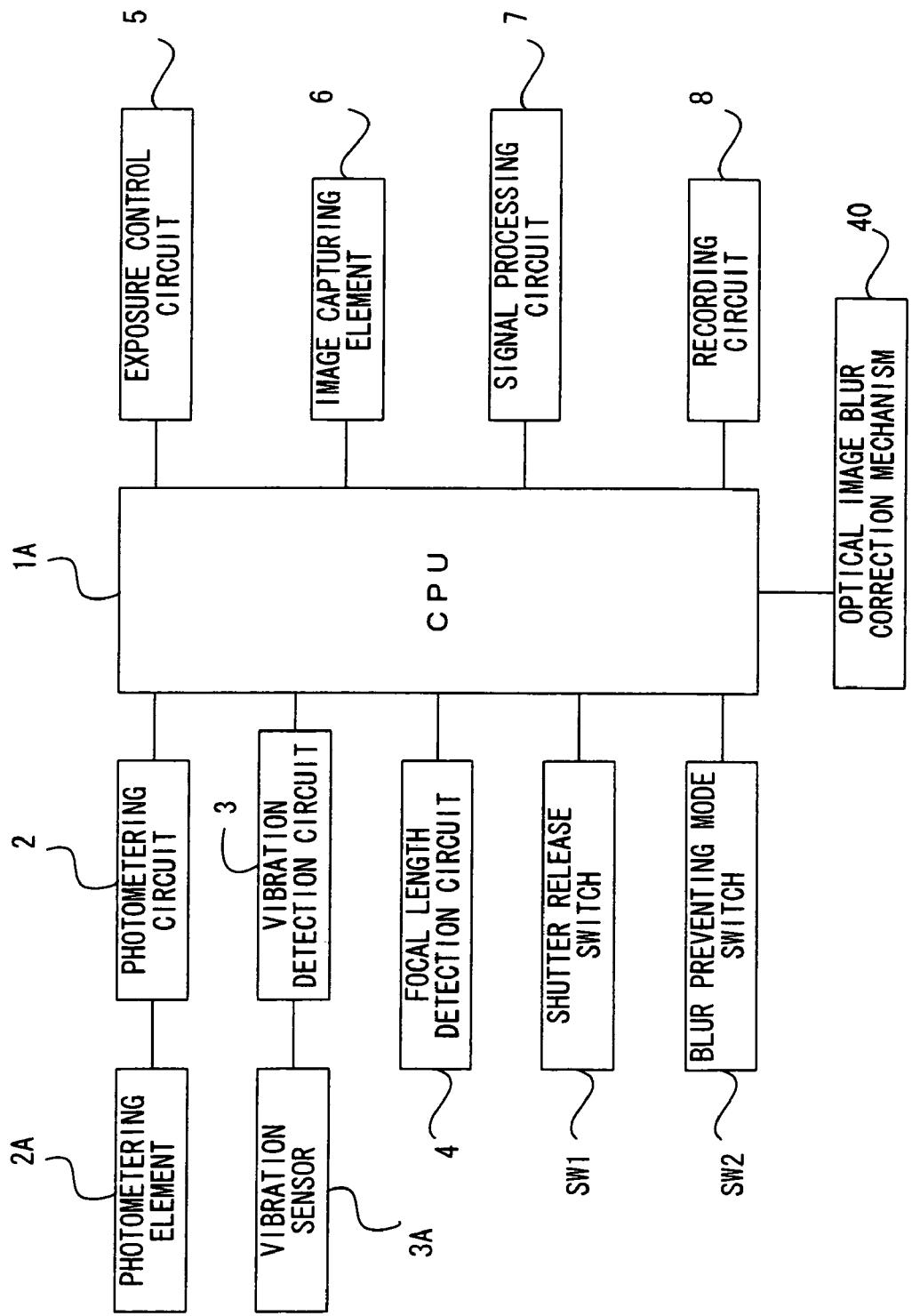
FIG. 4 is a block diagram of a control system of a digital still camera achieved as a variation of the embodiment of the present invention.

As shown in FIG. 4, an optical image blur correction mechanism 40 may be employed in conjunction with the ISO speed adjustment executed based upon the image blur quantity as explained above. The optical image blur correction mechanism 40 includes a blur correction lens (not shown) disposed within a photographing optical system, which is allowed to move along a direction perpendicular to the optical axis. The extent of image blur is reduced by driving a blur correction optical system that includes the blur correction lens based upon the extent of vibration to which the camera (lens) is subjected detected by the vibration sensor 3A. It is to be noted that the optical image blur correction mechanism 40 is controlled by a CPU 1A.

By employing such an optical image blur correction mechanism 40 to optically correct the image blur, it becomes possible to reduce the extent of image blur even when the focal length of the photographic lens 20 is f [mm] and the shutter speed is lower than 1/f [sec] by two to three stages. Accordingly, the image blur correction is executed by utilizing the optical image blur correction mechanism 40 alone under normal circumstances, but if the shutter speed is lower than 1/f [sec] by more than two or three stages, the sensitivity is raised in correspondence to the image blur quantity as well. Consequently, the image blur quantity can be kept under the limit value by preventing the shutter speed from becoming low, the effect of which can be further enhanced with the optical image blur correction. Namely, the ISO speed is adjusted in correspondence to the image blur quantity if the image blur quantity cannot be reduced to a value under the limit value simply by executing the optical image blur correction. Through this method, the image blur can be corrected even more effectively.

As explained above, prior to the photographing operation, the image blur quantity representing the extent of image blur to manifest in the photograph is calculated based upon the image-capturing sensitivity setting, and a decision is made as to whether or not the image-capturing sensitivity needs to be adjusted based upon the calculated image blur quantity in the embodiment of the present invention. Since the image-capturing sensitivity is adjusted only if necessary, the photographing operation can always be executed at the optimal sensitivity level in correspondence to the skill level of the photographer or the photographing conditions and, as a result, the extent of image blur can be highly effectively reduced without raising the sensitivity unnecessarily.

It is to be noted that the present invention may be adopted in a single lens reflex digital still camera instead of the digital still camera 10 achieved as a compact camera shown in FIG. 3 as in the embodiment.

The above described embodiment is an example, and various modifications can be made without departing from the spirit and scope of the invention.

What is claimed is:

1. A digital still camera comprising:
   a sensitivity setting device that sets an image-capturing sensitivity;
   a photographing device having an image-capturing element that receives a light flux transmitted through a photographic lens and executes photoelectric conversion on the received light flux;
   a photometric circuit which measures brightness of a field;
   a shutter speed calculation circuit which calculates a first shutter speed according to the image-capturing sensitivity set by the sensitivity setting device and the photometric result from the photometric circuit;
   a control device that operates the photographing device at the first shutter speed;
   a vibration quantity detection circuit that detects a vibration quantity of the camera;
   an image blur calculation device that calculates an image blur quantity at the time of photographing operation based on the first shutter speed and the vibration quantity of the camera detected by the vibration quantity detection circuit, prior to the photographing operation; and
   a determination device that makes a decision as to whether the image-capturing sensitivity needs to be adjusted based upon the image blur quantity calculated by the image blur calculation device, wherein:
   the sensitivity setting device adjusts the image-capturing sensitivity if the determination device determines that the image-capturing sensitivity needs to be adjusted; and
   if the image-capturing sensitivity is adjusted, a second shutter speed is calculated according to the adjusted image-capturing sensitivity and the photometric result from the photometric circuit; and
   the control device operates the photographing device at the second shutter speed.

2. A digital still camera according to claim 1, wherein:
   if the calculated image blur quantity exceeds a predetermined limit value, the sensitivity setting device shifts the image-capturing sensitivity to a higher level so as to lower the image blur quantity to a value equal to or less than the limit value.

3. A digital still camera according to claim 2, wherein:
   the image blur calculation device calculates the image blur quantity at the time of the photographing operation based on the first shutter speed, the vibration quantity of the camera detected by the vibration quantity detection circuit, and a focal length of the photographic lens.

4. A digital still camera according to claim 3, further comprising:
   an optical image blur correction mechanism that reduces the extent of image blur based upon the vibration quantity detected by the vibration quantity detection circuit, wherein:
   the determination device determines that the image-capturing sensitivity level needs to be adjusted if the image blur quantity cannot be lowered to a value equal to or less than the limit value through an image blur correction alone executed by the optical image blur correction mechanism.

5. A digital still camera according to claim 1, wherein:
the image blur calculation device calculates the image blur quantity at the time of the photographing operation based on the first shutter speed, the vibration quantity of the camera detected by the vibration quantity detection circuit, and a focal length of the photographic lens.

6. A digital still camera according to claim 5, further comprising:
an optical image blur correction mechanism that reduces the extent of image blur based upon the vibration quantity detected by the vibration quantity detection circuit, wherein;
the determination device determines that the image-capturing sensitivity needs to be adjusted if the image blur quantity cannot be lowered to a value equal to or less than a predetermined limit value through an image blur correction alone executed by the optical image blur correction mechanism.

7. A digital still camera according to claim 1, wherein:
the sensitivity setting device sets the image-capturing sensitivity to a lowest possible sensitivity level within a range over which the calculated image blur quantity does not exceed a predetermined limit value.

8. A digital still camera according to claim 1, further comprising:
a blur preventing mode switch operated to set/clear a blur preventing mode in which control is implemented to reduce the extent of image blur by adjusting the image-capturing sensitivity.

9. A digital still camera according to claim 1, wherein:
when adjusting the image-capturing sensitivity after the determination device determines that the image-capturing sensitivity needs to be adjusted, the sensitivity setting device sets an upper limit for the image-capturing sensitivity to a predetermined value which is set lower than a highest image-capturing sensitivity of the digital still camera.

10. A digital still camera according to claim 1, wherein:
the image-capturing sensitivity setting device does not adjust the image-capturing sensitivity if the shutter speed is set by a user.

11. An image blur correction apparatus comprising:
a sensitivity setting device that sets an image-capturing sensitivity;
an image capturing command output device that outputs a command signal for engaging an image-capturing element in photoelectric conversion at a first shutter speed according to a photometric result obtained by measuring brightness of a field and the image-capturing sensitivity set by the sensitivity setting device;
an image blur calculation device that calculates an image blur quantity at the time of photographing operation based on the first shutter speed and a vibration quantity of a camera, prior to the photographing operation; and
a determination device that makes a decision as to whether the image-capturing sensitivity needs to be adjusted based upon the image blur quantity calculated by the image blur calculation device, wherein:
the sensitivity setting device adjusts the image-capturing sensitivity if the determination device determines that the image-capturing sensitivity needs to be adjusted; and
when the image-capturing sensitivity is adjusted, the image capturing command output device outputs the command signal to the image-capturing element to engage the image-capturing element in photoelectric conversion at a second shutter speed according to the adjusted image-capturing sensitivity and the photometric result.

12. An image blur correction apparatus according to claim 11, further comprising:
a blur preventing mode switch operated to set/clear a blur preventing mode in which control is implemented to reduce the extent of image blur by adjusting the image-capturing sensitivity.

* * * * *